(12) United States Patent
Lee et al.

(10) Patent No.: US 8,921,725 B2
(45) Date of Patent: Dec. 30, 2014

(54) CONTROL MODULE AND ELECTRONIC DEVICE HAVING THE SAME

(75) Inventors: Hsien-Chang Lee, Taipei (TW);
Ming-Shun Lee, Taipei (TW)

(73) Assignee: Ability Enterprise Co., Ltd., Taipei (TW)

( * ) Notice: Subject to any disclaimer, the term of this patent is extended or adjusted under 35 U.S.C. 154(b) by 136 days.

(21) Appl. No.: 13/275,131

(22) Filed: Oct. 17, 2011

(65) Prior Publication Data

US 2012/0234662 A1 Sep. 20, 2012

(30) Foreign Application Priority Data

Mar. 14, 2011 (TW) .............................. 100108609 A

(51) Int. Cl.
- *H01H 19/20* (2006.01)
- *G03B 17/00* (2006.01)
- *H01H 25/06* (2006.01)

(52) U.S. Cl.
CPC .............. *G03B 17/00* (2013.01); *H01H 25/06* (2013.01); *H01H 2221/01* (2013.01); *H01H 2231/046* (2013.01); *H01H 2239/008* (2013.01); *H01H 2239/018* (2013.01)
USPC ........................................................ 200/570

(58) Field of Classification Search
USPC ........ 200/570, 564, 502, 51.17, 51.14, 19.18, 200/19.19, 410, 341, 336, 316, 17 R, 305
See application file for complete search history.

(56) References Cited

U.S. PATENT DOCUMENTS

| | | | | |
|---|---|---|---|---|
| 3,961,145 | A * | 6/1976 | Halbeck | 200/565 |
| 4,212,000 | A * | 7/1980 | Yamada | 396/258 |
| 4,870,863 | A * | 10/1989 | Duncan et al. | 73/431 |
| 5,401,926 | A * | 3/1995 | Aoyama et al. | 200/305 |
| 5,613,600 | A * | 3/1997 | Yokoji et al. | 200/564 |
| 6,067,424 | A * | 5/2000 | Shono | 396/297 |
| 6,229,103 | B1 * | 5/2001 | Yamamoto et al. | 200/4 |
| 6,339,200 | B1 * | 1/2002 | Shi et al. | 200/305 |
| 6,610,937 | B2 * | 8/2003 | Yamaguchi | 200/4 |
| 6,864,455 | B2 * | 3/2005 | Chou | 200/565 |
| 7,091,437 | B2 * | 8/2006 | Yeh et al. | 200/571 |
| 7,366,409 | B2 * | 4/2008 | Kurosawa | 396/543 |
| 7,400,239 | B2 * | 7/2008 | Kiko et al. | 340/501 |
| 7,511,235 | B2 * | 3/2009 | Osada | 200/6 A |
| 7,990,731 | B2 * | 8/2011 | Guo et al. | 361/753 |
| 8,178,805 | B2 * | 5/2012 | Larson et al. | 200/316 |
| 2002/0144882 | A1 | 10/2002 | Yamaguchi | |
| 2010/0000846 | A1 * | 1/2010 | Nemetz | 200/336 |

FOREIGN PATENT DOCUMENTS

CN 1380668 A 11/2002
TW M363601 8/2009

* cited by examiner

*Primary Examiner* — Edwin A. Leon
*Assistant Examiner* — Anthony R. Jimenez
(74) *Attorney, Agent, or Firm* — Rabin & Berdo, P.C.

(57) ABSTRACT

A control module and an electronic device having the same are disclosed. The control module includes a control panel, a return component, and a conductive element. The control panel includes a conductive port. The return component is disposed on the control panel. The return component includes a first end and a second end, and the return component is electrically contacted with the conductive port. The conductive element includes a first sidewall and a second sidewall. The conductive element is electrically contacted with the first end or the second end.

19 Claims, 4 Drawing Sheets

CONTROL MODULE AND ELECTRONIC DEVICE HAVING THE SAME

CROSS-REFERENCE TO RELATED APPLICATIONS

The entire contents of Taiwan Patent Application No. 100108609, filed on Mar. 14, 2011, from which this application claims priority, are incorporated herein by reference.

BACKGROUND OF THE INVENTION

1. Field of the Invention

The present invention generally relates to a control module, and more particularly to a control module which is applied in an electronic device.

2. Description of Related Art

With advances in technology, the digital camera devices have become much more popular in digital products, such as digital cameras, digital video cameras, mobile phones, personal digital assistants (PDAs), and so on. The digital camera device usually includes a control module for switching functions. For example, the digital camera usually has a select panel for switching zoom functions. The user can rotate the select panel for switching zoom functions. Moreover, in order to meet the needs of the appearance of the digital camera, the select panel of the digital camera should be treated by different surface treatments. The surface treatments can include the painting process, the electroplating process, the two-color injection process, and so on.

The electroplating process will form a metal surface on the select panel. Because of the metal properties, static electricity may be accumulated on the metal surface. When the static electricity is accumulated to a certain degree, the static electricity may be released and damage the digital camera. Finally, the digital camera cannot be used. Because of the electrostatic issue mentioned above, the appearance design of the select panel of the conventional digital camera is limited. The parts of the select panel, such as the knob, the frame, or the other parts should be treated by the same surface treatment in order to prevent the electrostatic issue. However, the design mentioned above may result in unnecessary restrictions on the appearance design. Thus, the appearance of the conventional digital camera may become monotonous.

For the reason that there are some disadvantages of the prior art mentioned above, there exists a need to propose a control module so as to meet consumer needs.

SUMMARY OF THE INVENTION

Accordingly, the present invention has been made in order to meet such a need described above, and it is an object of the present invention to provide a control module so as to meet consumer needs.

In order to achieve the above object, the present invention provides a control module. The control module includes a control panel, a return component, and a conductive element. The control panel includes a conductive port. The return component is disposed on the control panel. The return component includes a first end and a second end, and the return component is electrically contacted with the conductive port. The conductive element includes a first sidewall and a second sidewall. The conductive element is electrically contacted with the first end or the second end.

By the control module of the present invention, when the user rotates the control panel, the control panel can be grounded by way of the electrical contact between the return component and the conductive element. Therefore, the static electricity on the control panel can be released anytime. The static electricity will not be accumulated on the control panel. The static electricity on the control panel will not damage peripheral parts. Moreover, the control panel can be treated by the conductive surface treatment (the electroplating process) and the non-conductive surface treatment (the painting process) in the same time. The electroplating process can increase the quality feeling. The painting process can increase the variety of colors. The control module of the present invention does not have unnecessary restrictions on the appearance design. Thus, the appearance of the control module can become various.

DETAILED DESCRIPTION OF THE INVENTION

The detailed description of the present invention will be discussed in the following embodiments, which are not intended to limit the scope of the present invention, and can be adapted for other applications. While drawings are illustrated in detail, it is appreciated that the quantity of the disclosed components may be greater or less than that disclosed, except where expressly restricting the amount of the components.

The present invention generally relates to a control module which can be widely applied in many kinds of electronic devices. The control module can be rotated or pushed for switching functions. The electronic devices include but are not limited to picture capturing devices, handheld communication devices, digital cameras, digital video cameras, controllers of the game machines, or home electronic products.

Figure 1A:
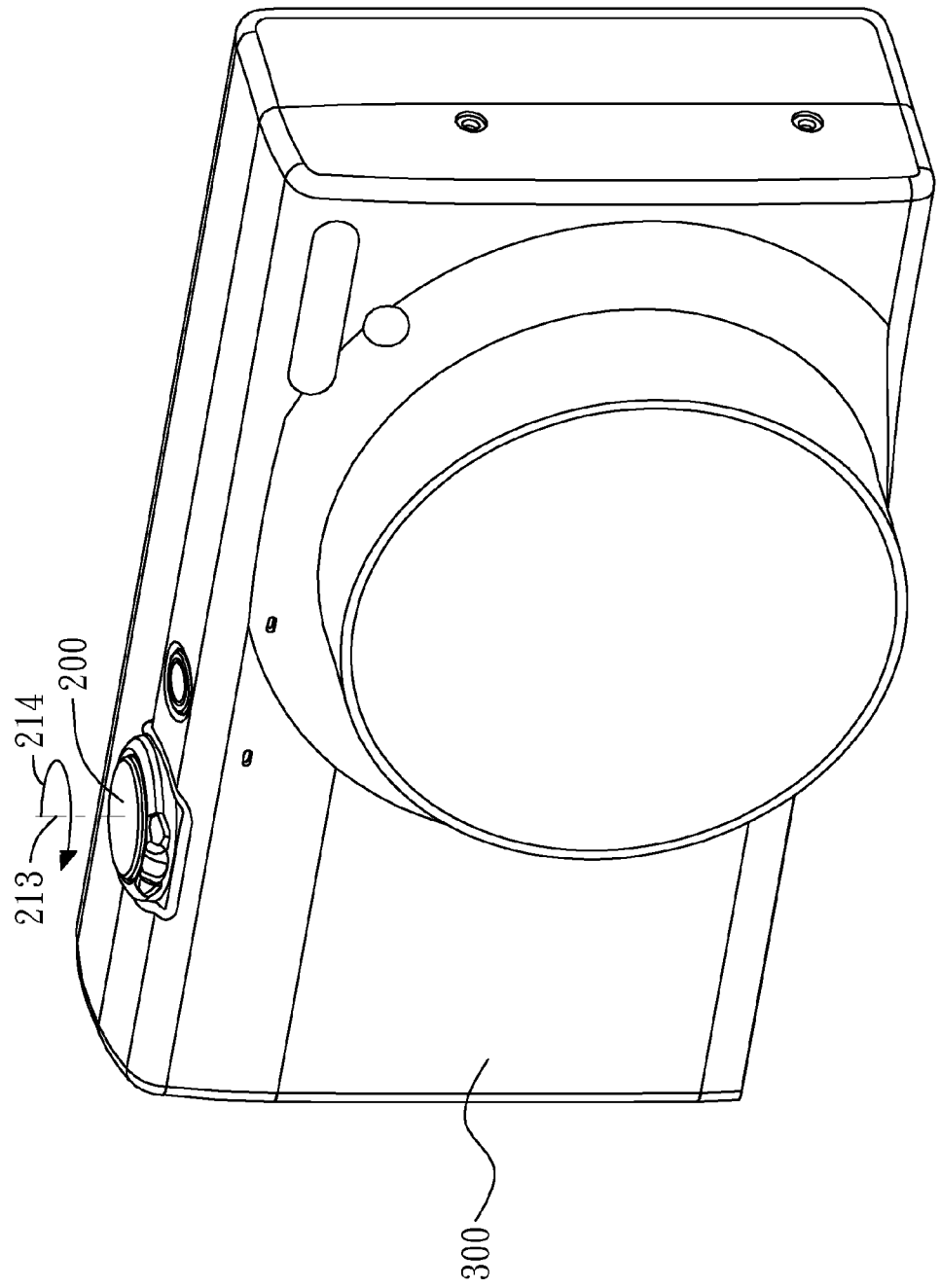
FIG. 1A shows the perspective view of a control module which is applied in an electronic device in accordance with an embodiment of the present invention.

FIG. 1A shows the perspective view of a control module 200 which is applied in an electronic device 300 in accordance with an embodiment of the present invention. As shown in FIG. 1A, a handheld electronic device 300 is provided as an example. The control module 200 is disposed on the electronic device 300, and the control module 200 has a rotation axis 213. The user can switch functions of the electronic device 300 by rotating the control module 200. For example, the user can rotate the control module 200 for switching zoom functions. The electronic device 300 can be a digital camera or a digital video camera having video or still image capturing functions but is not limited to this, and the function of the control module 200 is not limited to only switching zoom functions. The control module 200 can also perform other functions. Moreover, the handheld device can be a communication device or a home electronic product, such as a mobile phone, a tablet PC, a personal digital assistant (PDA), or a wireless controller.

Figure 1B:
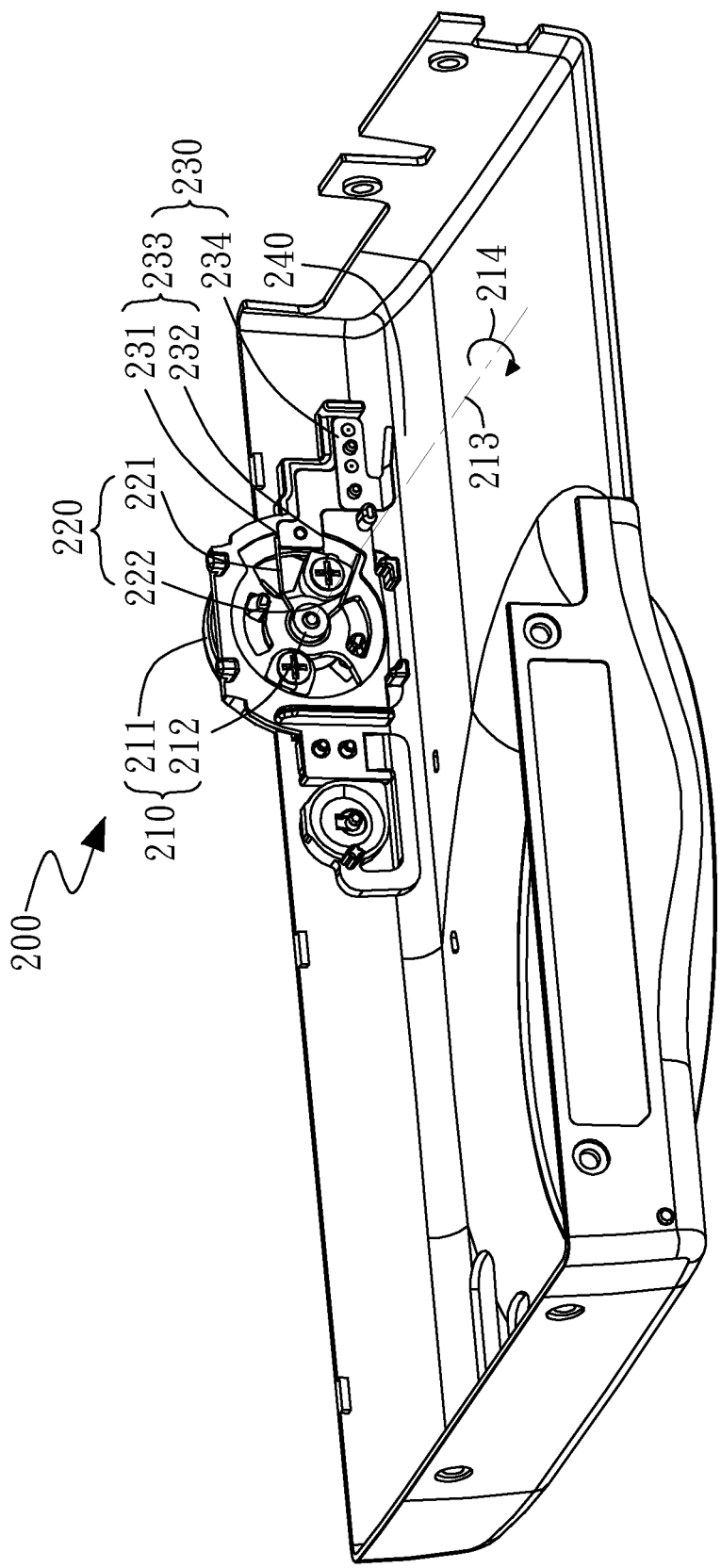
FIG. 1B shows the perspective view of the control module shown in FIG. 1A.

FIG. 1B shows the perspective view of the control module 200 shown in FIG. 1A. As shown in FIG. 1B, the control module 200 includes a control panel 210, a return component 220, and a conductive element 230. Herein, the control module 200 may provide a signal according to an external control command. The user can rotate the control panel 210 for changing the signal so as to switch functions. In the same time, the return component 220 and the control panel 210 rotate synchronously. The return component 220 is electrically contacted with the conductive element 230 selectively. When the user releases the control panel 210, the return component 220 can rotate the control panel 210 to the original position so as to revert the signal to the original condition. Whereby, the conductive element 230 can electrically release the static electricity on the control panel 210 by the conductive element 230 so as to prevent the accumulation of the static electricity.

The control panel 210 includes a conductive port 211. The return component 220 is disposed on the control panel 210. The return component 220 is electrically contacted with the conductive port 211 of the control panel 210. The return component 220 includes a first end 221 and a second end 222. The conductive element 230 includes a first sidewall 231 and a second sidewall 232. The conductive element 230 is electrically contacted with the first end 221 or the second end 222 of the return component 220. Moreover, the control module 200 can further include a ground end 240 so as to make the ground end 240 be electrically contacted with the conductive element 230.

In this embodiment, the ground end 240 can be a metal shell of the electronic device 300. By the electrical contact between the return component 220 and the conductive element 230, the static electricity on the control panel 210 can be released to the metal shell of the electronic device 300 anytime for preventing the accumulation of the static electricity. Thus, the static electricity on the control panel will not damage peripheral parts.

In this embodiment, the static electricity on the control panel 210 can be released anytime. Therefore, the appearance design of the control panel 210 does not have unnecessary restrictions because of the electrostatic issue. For example, there is no need for the surface treatment of the control panel 210 to be limited to the painting process because of the electrostatic issue. The control panel 210 can be a metal control panel or an alloy control panel which is electric conductive. Or the conductive port 211 of the control panel 210 can be treated by the electroplating process so as to make the surface be electric conductive. Moreover, the control panel can be treated by the conductive surface treatment (the electroplating process) and the non-conductive surface treatment (the painting process) in the same time. The electroplating process can increase the quality feeling. The painting process can increase the variety of colors. Thus, the appearance design of the control panel 210 is improved.

Referring to FIG. 1B again, specifically speaking, in this embodiment, the conductive element 230 includes a plate 233 and an elastic plate 234. The plate 233 has a first sidewall 231 and a second sidewall 232. The first end 221 or the second end 222 of the return component 220 is electrically contacted with the first sidewall 231 or the second sidewall 232 of the plate 233. The plate 233 is electrically contacted with the elastic plate 234, wherein the elastic plate 234 is a film-shape flexible element, the film-shape flexible element can be formed by the sheet metal forming process, and the elastic plate 234 is elastically contacted with the ground end 240, but is not limited to this, and the conductive element 230 can be designed in different ways. For example, the conductive element 230 can be formed integrally. Thus, there is no need for the conductive element 230 to be separated into the plate 233 and the elastic plate 234. Or the conductive element 230 can be a metal wire. One end of the metal wire is electrically contacted with the first end 221 or the second end 222, the other end of the metal wire is electrically contacted with the ground end 240.

Figure 2A:
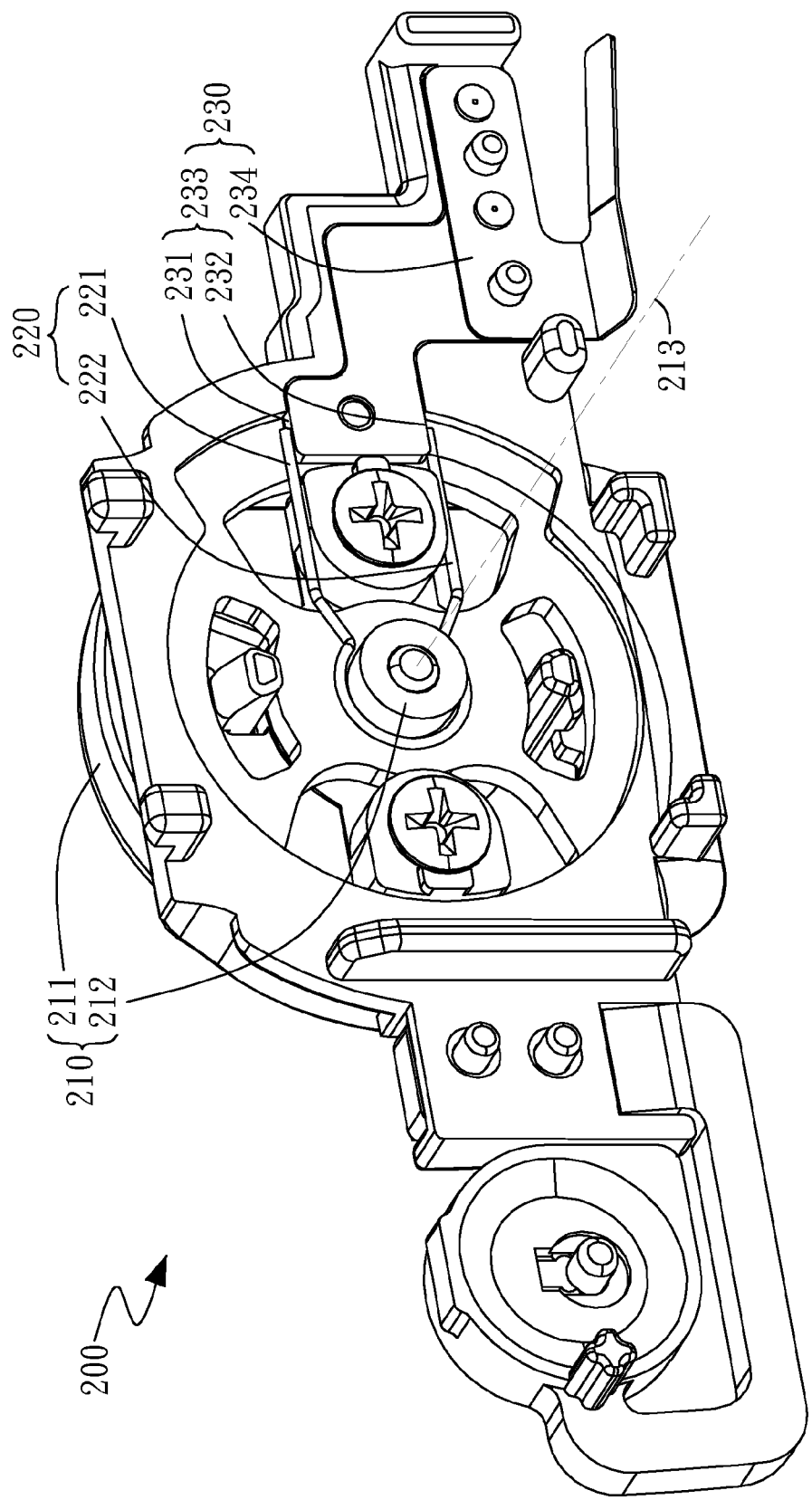
FIG. 2A and FIG. 2B show the operation method of the control module shown in FIG. 1A.
Figure 2B:
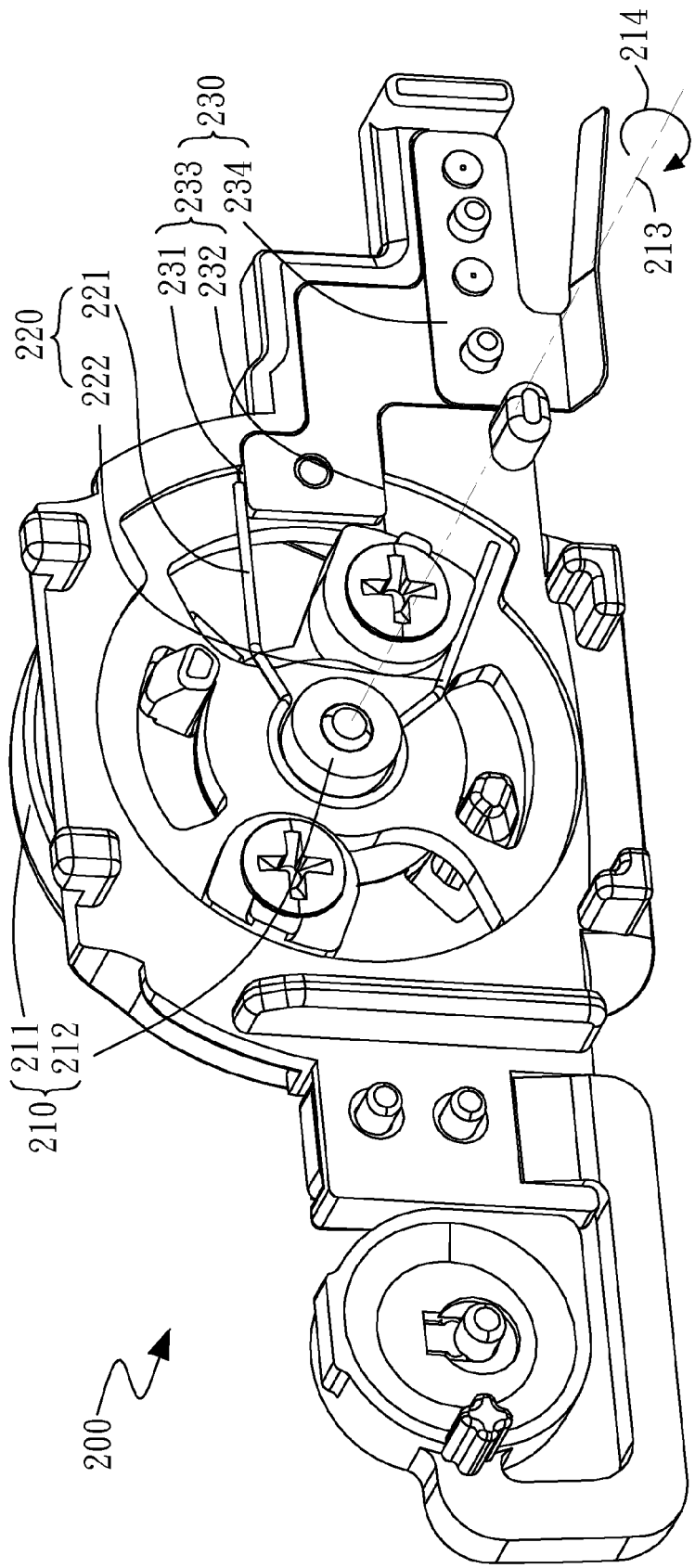

FIG. 2A and FIG. 2B show the operation method of the control module 200 shown in FIG. 1A. FIG. 2A shows the condition that the control panel 210 does not be rotated by the user. As shown in FIG. 2A, the control panel 210 is a rotatable knob, the user can switch functions by rotating the control panel 210. The conductive port 211 of the control panel 210 includes a shaft 212. The return component 220 can be a spring or a torsion spring. The return component 220 is set on the shaft 212, and the first end 221 and the second end 222 of the return component 220 are electrically contacted with the first sidewall 231 and the second sidewall 232 of the conductive element 230 respectively.

As shown in FIG. 2B, when the user rotates the control panel 210 in the clockwise direction 214, the second end 222 of the return component 220 does not contact the conductive element 230, and the first end 221 of the return component 220 is still electrically contacted with the conductive element 230. Similarly, when the user rotates the control panel 210 in the counter-clockwise direction 214 for switching functions, the first end 221 of the return component 220 does not contact the conductive element 230, and the second end 222 of the return component 220 is still electrically contacted with the conductive element 230. Moreover, as shown in FIG. 2A, when the user releases the control panel 210, the return component 220 can rotate the control panel 210 to the original position. The first end 221 and the second end 222 of the return component 220 are electrically contacted with the first sidewall 231 and the second sidewall 232 of the conductive element 230 respectively. Therefore, the return component 220 is always electrically contacted with the conductive element 230. The static electricity on the control panel 210 can be released anytime so as to prevent the accumulation of the static electricity.

By the design mentioned above, when the user rotates the control panel, the control panel can be grounded by the way of the electrical contact between the return component and the conductive element. Therefore, the static electricity on the control panel can be released anytime. The static electricity will not be accumulated on the control panel. Thus, the static electricity on the control panel will not damage peripheral parts. Moreover, the control panel can be treated by the conductive surface treatment and the non-conductive surface treatment in the same time. The control module of the present invention does not have unnecessary restrictions on the appearance design. Thus, the electronic device having the control module of the present invention can have various appearances so as to meet consumer needs for the electronic device.

Although specific embodiments have been illustrated and described, it will be appreciated by those skilled in the art that various modifications may be made without departing from the scope of the present invention, which is intended to be limited solely by the appended claims.

What is claimed is:

1. A control module, comprising:
a control panel comprising a conductive port;
a return component being disposed on said control panel, said return component having a first end and a second end, and said return component being in electrical contact with said conductive port; and
a conductive element having a first sidewall and a second sidewall, said conductive element, wherein said control panel is operable to move the return component between a first position in which the first end of the return component contacts the conductive element and a second position in which the second end of the return component contacts the conductive element being continuously in electrical contact with the return component via said first end and said second end alternatively contacting the conductive element, wherein said control panel is operable to move the return component between a first position in which the first end of the return component contacts the conductive element and a second position in which the second end of the return component contacts the conductive element.

2. The control module according to claim 1, wherein said conductive port of said control panel comprises a shaft, said return component is set on said shaft, and said first end or said second end electrically contacts said first sidewall or said second sidewall of said conductive element, respectively.

3. The control module according to claim 1, wherein
said conductive element further comprises an elastic plate, and another plate having said first sidewall and said second sidewall,
said another plate electrically contacts said elastic plate, and
said first end or said second end electrically contacts said first sidewall or said second sidewall.

4. The control module according to claim 1, further comprising a ground end electrically contacting said conductive element.

5. The control module according to claim 4, wherein said conductive element is a metal wire, one end of said metal wire electrically contacts said first end, and the other end of said metal wire electrically contacts said ground end.

6. The control module according to claim 4, wherein said conductive element further comprises an elastic plate, which elastically contacts said ground end.

7. The control module according to claim 6, wherein said elastic plate is a film-shape flexible element.

8. The control module according to claim 4, wherein said ground end is a metal shell of an electronic device.

9. The control module according to claim 3, wherein said elastic plate is formed by a sheet metal forming process.

10. The control module according to claim 1, wherein said conductive port is formed by an electroplating process.

11. The control module according to claim 1, wherein said control panel is a metal control panel.

12. The control module according to claim 11, wherein said control panel is a rotatable knob.

13. The control module according to claim 1, wherein said return component is a spring or a torsion spring.

14. An electronic device comprising the control module claimed in claim 1.

15. A control module for providing a signal, comprising:
a control element changing said signal and comprising a shaft;
a reverting element reverting said signal, and comprising a torsion spring set on said shaft, wherein the reverting element has a first end and a second end; and
a conductive element releasing static electricity of said control module, wherein the reverting element is electrically contacted with the conductive element continuously via said first end and said second end alternatively contacting the conductive element, wherein said control element is operable to move the reverting element between a first position in which the first end of the reverting element contacts the conductive element and a second position in which the second end of the reverting element contacts the conductive element.

16. The control module according to claim 15, wherein
said conductive element comprises an inelastic plate and another plate,
said another plate electrically contacts said elastic plate,
said another plate comprises a first sidewall and a second sidewall,
said reverting element comprises a first end and a second end, and
said first end or said second end electrically contacts said first sidewall or said second sidewall.

17. An electronic device having a control module, said control module comprising:
a control panel performing rotation according to a control command;
a conductive element; and
a return component rotating with said control panel synchronously, wherein the return component having a first end and a second end electrically contacts said conductive element continuously via the first end and the second end alternatively contacting the conductive element, and said conductive element electrically contacts said control panel, wherein said control panel is operable to move the return component between a first position in which the first end of the return component contacts the conductive element and a second position in which the second end of the return component contacts the conductive element.

18. The electronic device according to claim 17, wherein said return component is a torsion spring, said control panel comprises a conductive port, and said torsion spring is in electrical contact with a first conductive portion or a second conductive portion of said conductive element by the rotation of said control panel.

19. The electronic device according to claim 18, wherein said conductive port comprises a shaft, said torsion spring being set on said shaft.

* * * * *